Patented Jan. 5, 1937

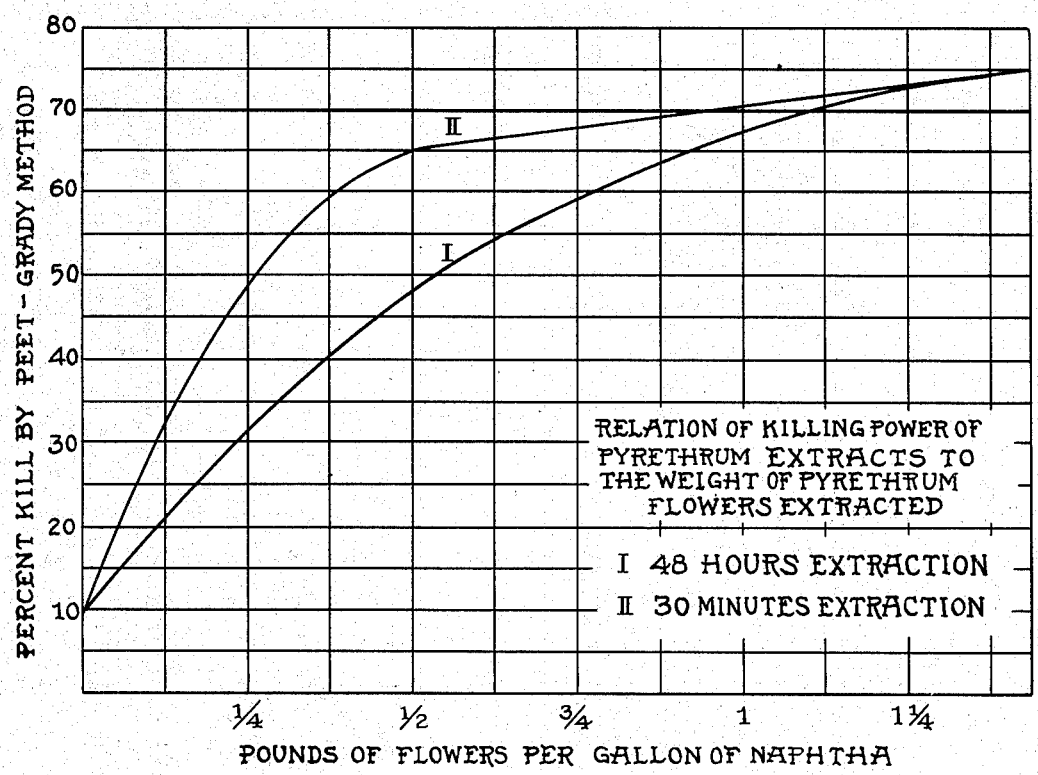

2,066,737

UNITED STATES PATENT OFFICE 2,066,737

MAKING PYRETHRIN INSECTICIDE

Irving E. Muskat, Pittsburgh, Pa., assignor to Gulf Research & Development Company, Pittsburgh, Pa., a corporation of Delaware Application June 10, 1935, Serial No. 25,959

3 Claims. (Cl. 167—24)

This invention relates to making pyrethrin insecticides; and it comprises a method of treating pyrethrum flowers and like material with a petroleum distillate to make a liquid extract of high insecticidal value, wherein the toxic pyrethrin is extracted from the flowers and inert soluble matter is left unextracted by immersing the flowers in a suitable quantity of the petroleum distillate at ordinary temperatures for a short time and the liquid extract is then filtered from the extracted material, the killing power of the extract being increased by decreasing the extraction; all as more fully hereinafter set forth and as claimed.

Pyrethrum flowers have long been utilized for their insecticidal properties. The material known variously as Persian insect powder, Dalmatian powder and "buhach" is made by pulverizing the dried flowers or leaves of various species of pyrethrum plants. In late years the active toxic ingredient designated pyrethrin has been extracted from the pyrethrum material by various organic solvents and the liquid extract used for spraying as an insecticide. Sometimes in large scale work the liquid extract is emulsified with water for spraying purposes.

To make the liquid extracts used for spraying insects, the pyrethrum material has usually been subjected to long periods of extraction by various solvents, such as gasoline, kerosene, alcohols and chlorinated organic compounds. The solvents have usually been heated during the extraction treatment in order to make the extraction more complete and to increase the concentration of extracted matter in the solvent. It has even been proposed to extract 10 parts by weight of pyrethrum flowers with one part of solvent. It has also been proposed to increase the concentration of the extract by evaporating part of the solvent. The chief difficulty with these older methods of extraction has been the simultaneous extraction from the flowers of inert matter, such as resins, waxes, greases and indefinite "extractive matters". This inert matter is substantially without toxic effect upon the insects. Prior processes have however extracted the greater part of the soluble inert matter as an incident of efforts to completely extract the toxic pyrethrin.

The main object achieved in the present invention is an increase of the toxic efficiency in use of pyrethrum materials by making a pyrethrum extract of high toxic value per unit of contained pyrethrin; the active toxic principle of the pyrethrum flowers. This object is accomplished by extracting the pyrethrin of the flowers under conditions leaving inert extractive matter for the most part unextracted.

Insects, such as flies and mosquitos, have shells containing passages through which the insect obtains its supply of air. The chitin shell of any insect is water repellant in its nature; aqueous liquids do not readily enter the spiracles or passages through which the insect gets its air. When kerosene is used as a carrier for poison, the kerosene enters the spiracles readily and when pyrethrin extracted from pyrethrum flowers is the poison to be utilized, it is carried into the insect spiracles by the kerosene and exercises a specific poisonous effect. In this action, the kerosene entering the spiracles disappears, leaving the pyrethrin behind to exercise its specific toxic action. It is desirable that the pyrethrin be as pure as possible and not mixed with inert non-toxic material having an inhibiting or masking effect upon the toxic action of the pyrethrin.

I have discovered that when a pyrethrum distillate, such as gasoline or kerosene, is used as the solvent for extracting pyrethrin from pyrethrum flowers and when the extraction is made under conditions preventing as far as possible the extraction of inert non-toxic matter, such as resins, greases, etc., the extract has a much greater toxic effect than when it contains substantial amounts of inert matter. I have also discovered that the pyrethrin is much more readily soluble in the petroleum distillate than is the inert matter of the flowers and that, by a quick extraction allowing only a short time of contact between the flowers and the solvent, the extraction of inert matter is kept at a minimum and the extract has a much greater toxic effect. I have found, for example, that by immersing the flowers in a quantity of petroleum naphtha of the order of 1 gallon of distillate to ½ pound of flowers for a period of about 20 minutes and then removing the liquid from the residue of flowers, the toxicity of the extract as determined by the Peet-Grady standard test is nearly equal to the toxicity of an extract made by prolonged treatment of one pound of flowers in a gallon of naphtha. The insecticidal effect obtained per unit weight of flowers is thus doubled in relation to the older extraction methods in which prolonged contact of the flowers with the solvent effected extraction of large amounts of inert soluble matter in the flowers together with the active pyrethrin.

In extracting pyrethrum flowers by immersion in a petroleum distillate such as kerosene or petroleum naphtha, it is, as I have found, unnecessary to heat the solvent during the extraction. All that is necessary is to proportion the quantity of solvent to the weight of flowers so as to get a moderate concentration of pyrethrin in the liquid extract and to limit the duration of contact between the flowers and the solvents so that a minimum amount of inert matter is extracted.

The toxic pyrethrin in pyrethrum flowers usually averages about 1 per cent by weight of the flowers. As I have found, nearly all of the pyrethrin is extracted by treatment with petroleum naphtha for 30 minutes or less at ordinary temperatures and this is done without extracting much of the inert soluble matter. I have found that extraction of pyrethrum flowers with a solvent really takes place in two phases; a first stage where extraction is rapid and the extract is highly toxic, and a second stage where extraction becomes slow, and the extracted matter is largely of a greasy resinous nature having small toxic value. Naturally the two stages shade into each other to a certain extent but nevertheless there is a tolerably abrupt change. By confining the extraction to the first stage, I obtain an extract containing the greater part of the toxic value of the pyrethrum and but little of the inert soluble matter to inhibit the insecticidal action of the extract.

In extracting ½ pound pyrethrum with one gallon of naphtha for a period of 20 minutes, about 2 per cent by weight of the flowers is extracted and the extract contains about 0.148 per cent of extracted matter. If the extraction be continued to a one hour period (three times as long) the total extracted matter may be 3.4 per cent of the flowers and 0.25 per cent of the extract. But the killing power of the extract is no greater than that of the 20 minute extract. As the time of extraction is increased further, the killing power of the extract becomes smaller. The total extraction of 4 per cent of the flowers in a concentration of 0.3 per cent in the extract is accompanied by a decrease of 25 to 30 per cent in the killing power of the extract as compared to a 2 to 3 per cent extraction in 20 to 30 minutes; the killing power being thus an inverse function of the percentage extraction.

Sufficient extraction to give a highly toxic extract is usually obtained with a time of contact less than one hour. In most cases 15 to 30 minutes suffices. A satisfactory extract for direct use as an insecticide is obtained by extracting ½ pound pyrethrum with one gallon of petroleum naphtha. As much as 2½ gallons naphtha per pound of flowers may be used without extracting deleterious amounts of inert solubles. On the other hand, extraction of as much as 10 pounds flowers per gallon of naphtha gives a concentrated extract containing most of the pyrethrin of the flowers in a concentration 20 times as great as the standard extract of ½ pound of flowers per gallon of naphtha. This concentrate is diluted with naphtha for use as an insecticidal spray. For example, 2 per cent by weight of flowers is extracted in a concentration of 2.87 per cent of the extract made from 10 pounds of flowers per gallon of naphtha in 30 minutes. Such an extract may be diluted 1 to 20 and the diluted extract has substantially the same killing power as the 20 minute extract of ½ pound flowers per gallon naphtha.

In the accompanying graph, I have shown two curves of the comparative killing power of pyrethrin extracts as tested by the Peet-Grady method and plotted against increasing quantities of flowers extracted per gallon of petroleum naphtha. The curves show a comparison of the old method of extraction by prolonged contact between the flowers and the solvent with the present method of extraction in which the time of contact is limited in order to prevent extraction of inert matter.

In the graph, curve I shows the result in killing power of the diluted extract made by allowing 1 gallon of the solvent to remain in contact with varying weights of the flowers for a period of 48 hours. Curve II shows the results with an extract made with one gallon of the same solvent left in contact with varying weights of the flowers for 30 minutes. In both cases the solvent used was a naphtha distillate of 42.9° A. P. I. gravity at 60° F. (0.8113 sp. gr.).

It is noted that in the extracts of flowers up to ½ pound of flowers per gallon of naphtha the killing power of the extract made by short time extraction is about 50 per cent greater than that of the extract made by prolonged contact. With greater quantities of flowers per gallon of naphtha the difference in killing power gradually drops until the extracts from 1¼ pounds of flowers have the same killing power. In both extracts the killing powers increase with increased concentrations of extracted matter, but in the less concentrated extracts the increase is greater with the short time extraction than with the old method of prolonged extraction. The most striking result, however, shown by the graphs is the fact that nearly the same killing capacity is obtained from ½ pound of flowers with short extraction as from 1 pound of flowers with prolonged extraction. The fact that the difference in killing powers of the extracts becomes less with increased quantities of flowers extracted is associated with the asymptotic characteristic of the Peet-Grady test.

In the practice of the short time extraction of pyrethrum materials in a ratio of ½ pound per gallon of solvent according to the present invention, the flowers, which may be ground, if desired, are placed in a suitable receptacle and solvent is run in and mixed with the flowers by agitation. The agitation may continue for 15 to 30 minutes and then the mixture is run directly through a suitable filter. Suction filtration is usually advantageous. The filtrate is used as a spray insecticide.

When making more concentrated extracts for dilution or emulsification in use as insecticides, the filter cake is advantageously washed quickly with a small amount of solvent to remove adhering filtrate. The washings may either be added to the filtrate or used directly as a dilute extract.

As stated, I have found that a time of immersion of the flowers in the solvent less than one hour is usually effective in extracting the active pyrethrin without extracting deleterious amounts of inert matter from the flowers. I have found that in the extraction a quantity of solvent between 2½ gallons and 0.1 gallon per pound of flowers is suitable for the extraction of pyrethrin. The residue of flowers left after the extraction has a small insecticidal value but it is usually not worth recovering. The loss of this residual value is many times compensated by the increased activity of the extract obtained in a short time extraction.

What I claim is:—

1. A method of making an extract of pyrethrum flowers in petroleum distillate for insecticidal purposes which comprises immersing the flowers in the distillate in a ratio between 2½ and 0.1 gallons of distillate per pound of flowers and for a time less than one hour and separating the liquid extract from the residue of flowers.

2. In extracting pyrethrin from pyrethrum flowers or like material in a petroleum distillate, a method of increasing the insecticidal power of the extract which comprises immersing the flowers in a sufficient quantity of the distillate to extract the greater part of the pyrethrin in the flowers and preventing the extraction of inert matter from the flowers by limiting the time of immersion to less than one hour.

3. A process which comprises immersing pyrethrum flowers in petroleum naphtha in a ratio from 0.4 pound to 10 pounds flowers per gallon of naphtha from 20 to 30 minutes and then filtering the resulting liquid extract from the extracted residue of flowers.

IRVING E. MUSKAT.